(12) United States Patent
Bindra et al.

(10) Patent No.: US 10,703,190 B2
(45) Date of Patent: Jul. 7, 2020

(54) HYBRID VEHICLE ENGINE BRAKE

(71) Applicant: Ford Global Technologies, LLC, Dearborn, MI (US)

(72) Inventors: Raunak Singh Bindra, West Bloomfield, MI (US); Mark Gerard Czapski, Novi, MI (US); Norman Jerry Bird, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 40 days.

(21) Appl. No.: 16/195,122

(22) Filed: Nov. 19, 2018

(65) Prior Publication Data

US 2020/0156457 A1 May 21, 2020

(51) Int. Cl.
*B60K 6/445* (2007.10)
*F02N 11/00* (2006.01)
*B60K 6/30* (2007.10)
*F16D 41/16* (2006.01)
*B60K 6/365* (2007.10)

(52) U.S. Cl.
CPC ............ *B60K 6/445* (2013.01); *B60K 6/30* (2013.01); *B60K 6/365* (2013.01); *F02N 11/00* (2013.01); *F16D 41/16* (2013.01); *B60Y 2200/92* (2013.01)

(58) Field of Classification Search
None
See application file for complete search history.

(56) References Cited

U.S. PATENT DOCUMENTS

| 6,702,709 | B2 * | 3/2004 | Bowen ................... B60K 6/365 475/277 |
| 8,152,669 | B2 | 4/2012 | Maguire et al. |
| 10,197,111 | B2 * | 2/2019 | Endo ....................... F16D 41/12 |
| 10,385,933 | B2 * | 8/2019 | Schneider ............. F16D 41/066 |
| 2014/0357441 | A1 | 12/2014 | Supina |

FOREIGN PATENT DOCUMENTS

WO 2018152617 A1 8/2018

* cited by examiner

*Primary Examiner* — Dirk Wright
(74) *Attorney, Agent, or Firm* — David Kelley; Brooks Kushman, P.C.

(57) ABSTRACT

A powersplit hybrid powertrain includes an electrically actuated brake that selectively engages a ring gear attached to a flywheel. The ring gear may be, for example, a starter ring gear. Engagement of the brake while the engine is stopped permits use of both electric machines to provide torque to vehicle wheels, thereby increasing the electric torque capacity of the powertrain. The position of the brake is more space efficient than conventional input shaft brakes.

17 Claims, 6 Drawing Sheets

HYBRID VEHICLE ENGINE BRAKE

TECHNICAL FIELD

This disclosure relates to the field of hybrid vehicles. More particularly, the disclosure pertains to an engine brake to increase electric-only torque capacity and regenerative braking capability.

BACKGROUND

Many vehicles are used over a wide range of vehicle speeds, including both forward and reverse movement. Internal combustion engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Hybrid vehicle transmissions improve fuel economy by providing energy storage. In a hybrid electric vehicle, for example, energy may be stored in a battery. The battery may be charged by operating the engine to produce more power than instantaneously required for propulsion. Additionally, energy that would otherwise be dissipated during braking can be captured and stored in the battery. The stored energy may be used later, allowing the engine to produce less power than instantaneously required for propulsion and thereby consuming less fuel.

SUMMARY OF THE DISCLOSURE

A vehicle powertrain includes an internal combustion engine, a transmission, and a brake. The internal combustion engine has a crankshaft coupled to a flywheel. The flywheel includes a ring gear, such as a starter ring gear. The transmission has an input shaft coupled to the flywheel. The transmission may also include a planetary gear set and two electric machines. The planetary gear set has a sun drivably connected to a first electric machine, a carrier coupled to the input shaft, and a ring drivably connected to a differential. The second electric machine is driveably connected to the differential. The brake selectively engages the ring gear to selectively hold the crankshaft against rotation. The brake may be electrically actuated. The brake may be a one-way brake.

A vehicle powertrain includes an internal combustion engine, a planetary gear set, at least two electric machines, and a brake. The internal combustion engine has a crankshaft coupled to a flywheel having a ring gear, such as a starter ring gear. The planetary gear set has a sun drivably connected to a first electric machine, a carrier coupled to the flywheel, and a ring drivably connected to a differential. The second electric machine is driveably connected to the differential. The brake selectively engages the ring gear to selectively hold the crankshaft against rotation. In some embodiments, the brake may include a first pawl and a solenoid. The first pawl is supported to pivot between a first disengaged position and a first engaged position. In the first engaged position, the first pawl prevents rotation of the ring gear in a first direction. The solenoid moves a pin in response to electric current such that the pin pushes the first pawl into the first engaged position. A second pawl may be supported to pivot between a second disengaged position and a second engaged position. In the second engaged position, the second pawl prevents rotation of the ring gear in a second direction opposite the first direction. Extension of the pin may simultaneously push the first pawl into the first engaged position and the second pawl into the second engaged position. On the other hand, the solenoid may push the first pawl into the first engaged position in response to an electrical current and push the second pawl into the second engaged position in response to an opposite electrical current.

A transmission includes a flywheel, an input shaft, and a brake. The flywheel has a ring gear and is adapted for fixation to a crankshaft of an internal combustion engine. A starter motor may drive a pinion gear which is configured to selectively engage the ring gear to start the engine. The input shaft is coupled to the flywheel. The brake selectively engages the ring gear to selectively hold the crankshaft against rotation. The brake may be electrically actuated. The brake may be a one-way brake. The transmission may also include a planetary gear set and two electric machines. The planetary gear set has a sun drivably connected to a first electric machine, a carrier coupled to the input shaft, and a ring drivably connected to a differential. The second electric machine is driveably connected to the differential.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of rotating elements are fixedly coupled to one another if they are constrained to have the same rotational speed about the same axis in all operating conditions. Rotating elements can be fixedly coupled by, for example, spline connections, welding, press fitting, or machining from a common solid. Slight variations in rotational displacement between fixedly coupled elements can occur such as displacement due to lash or shaft compliance. In contrast, two rotating elements are selectively coupled by a shift element when the shift element constrains them to have the same rotational speed about the same axis whenever the shift element is fully engaged and the elements are free to have distinct speeds in at least some other operating condition. Two rotating elements are coupled if they are either fixedly coupled or selectively coupled. Two rotating elements are driveably connected if a series of gears and shafts is capable of transmitting power from one to the other and establishes a fixed speed ratio between the two elements.

Figure 1:
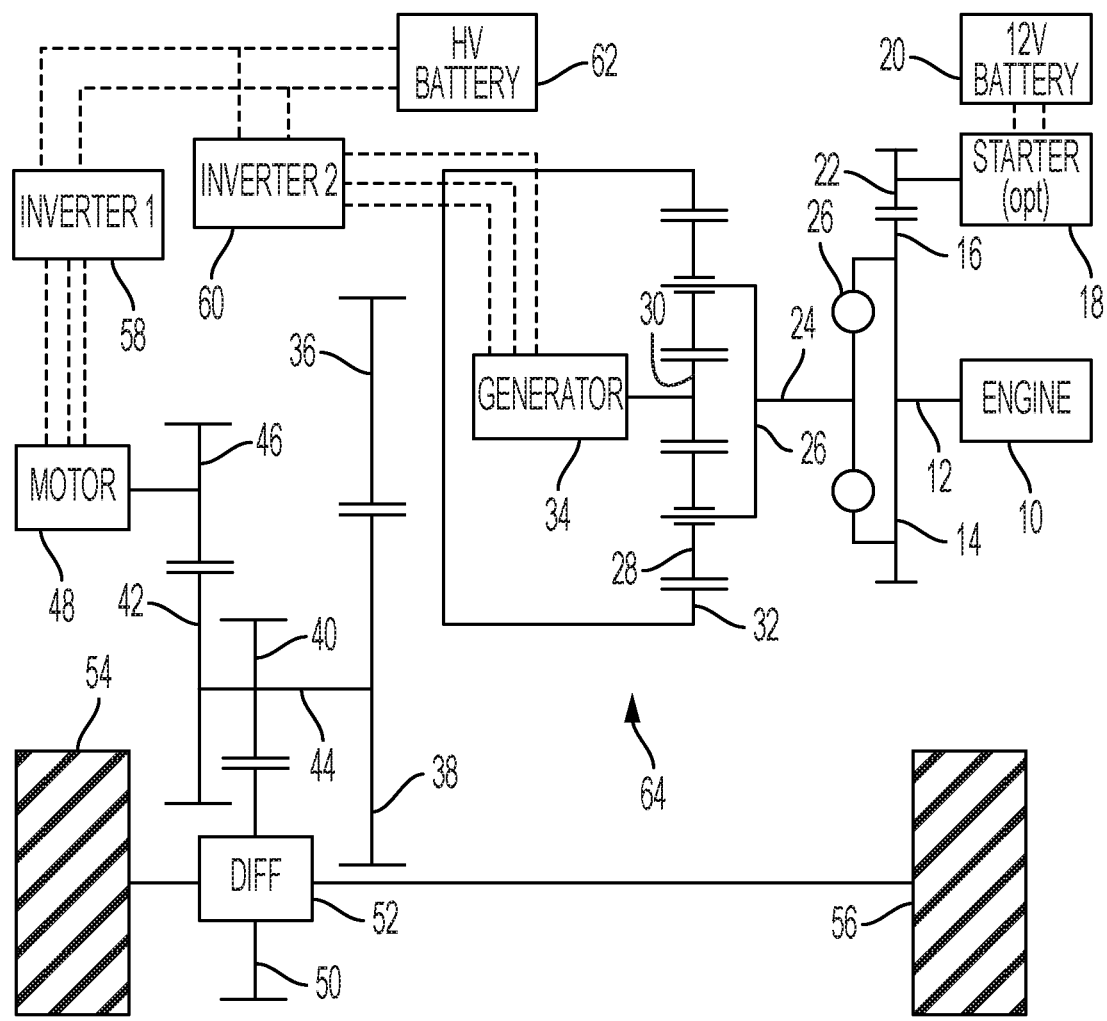
FIG. 1 is a schematic diagram of a hybrid electric powertrain.

FIG. 1 schematically illustrates a kinematic arrangement for a power-split type hybrid electric vehicle. Power is provided by engine 10 which drives crankshaft 12. Crankshaft 12 is fixedly coupled to flywheel 14. The inertia of the flywheel helps to reduce rotational speed variation due to the firing pulses produced by an internal combustion engine. A ring gear 16 is fixed to the outer periphery of flywheel 14. In some embodiments, a starter 18 driven by low voltage battery 20 may drive a pinion gear 22. To start the engine, pinon gear is moved into engagement with ring gear 16 and then powered is provided to starter 18 to bring the engine up to a speed at which combustion can be sustained. Once the engine is started, the pinion gear is typically disengaged from the ring gear to avoid subjecting the starter motor to high engine speeds. As will be discussed later, other components are also capable of starting the engine, so the starter motor may not be present in all embodiments. Transmission input shaft 24 is driven by flywheel 14 via torsional isolator 26 which further shields the transmission from engine torque pulses. The flywheel and torsional isolator are commonly located outside of the sealed transmission case.

Transmission input shaft 24 is fixedly coupled to planet carrier 26. A set of planet gears 28 are supported for rotation with respect to carrier 26. Sun gear 30 and ring gear 32 are each supported for rotation about the same axis as carrier 26 and each mesh with the planet gears 28. Generator 34 is fixedly coupled to sun gear 30. Layshaft gear 36 is fixedly coupled to ring gear 32 and meshes with layshaft gear 38. Layshaft gear 38 is fixedly coupled to layshaft gears 40 and 42 via shaft 44. Layshaft gear 46 meshes with layshaft gear 42 and is fixedly couple to motor 48. Layshaft gear 40 meshes with layshaft gear 50 which is the input to differential 52. Differential 52 drives wheels 54 and 56 allowing slight speed differences as the vehicle turns a corner.

Generator 34 and motor 48 are both reversible electric machines. Both machines are capable of converting electrical power to mechanical power or converting mechanical power to electrical power. In this example, each machine is a synchronous Alternating Current (AC) motor. Motor 48 is powered by inverter 58. Similarly, generator 34 is powered by inverter 60. Both inverters are electrically connected to high voltage battery 62.

The planetary gear set, differential 52, generator 34, motor 48, and layshaft gearing among these components are typically referred to as a transmission or transaxle 64. These components are typically contained within a housing called a transmission case. The inverters 58 and 60 are typically mounted to the outside of the transmission case but may be mounted remotely. Transmission input shaft 24 and the two half-shafts penetrate the transmission case.

In some circumstances, engine 10 may generate more power than is delivered to the vehicle wheels 54 and 56 with the excess power stored in battery 62. In other circumstances, power may flow from battery 62 permitting engine 10 to produce less power than the instantaneous demand of the vehicle. For example, the engine 10 may be off while power to propel the vehicles comes from battery 62. During braking maneuvers, motor 48 may exert negative torque, thus producing electrical energy that is stored in battery 62 to reduce future use of engine 10. Use of motor 48 to provide braking in this manner is called regenerative braking.

The engine may be started without using starter 18 by using generator 34. As long as there is a reaction torque at ring gear 32, torque produced by generator 34 will tend to rotate the engine crankshaft. The reaction torque at ring gear 32 may be provided by motor 48, a parking pawl (if the vehicle is stationary), or the inertia of the vehicle.

The total torque exerted on the vehicle wheels is a function of the torque exerted by motor 48, the torque exerted by generator 34, and the torque exerted on the transmission input shaft 24. Torque generated by motor 48 is transmitted at a fixed ratio to the wheels, with the ratio dictated by the tooth numbers of gears 46, 42, 40, and 50. Torque applied to ring gear 32 is also transmitted at a fixed ratio to the wheels, with the ratio determined by tooth number of gears 36, 38, 40, and 50. The torque exerted on ring gear 32 is proportional to the torque exerted on sun gear 30 and on carrier 26. In most operating conditions, the torque exerted on sun gear 30 is generated by generator 34 and the torque exerted on carrier 26 is generated by engine 10. However, when the engine is off, the torque that it exerts on carrier 26 is limited to engine friction, which is orders of magnitude less than the torque capacity when the engine is running. Therefore, unless some other device is added, generator 34 is not capable of contributing significant wheel torque when the engine is off.

One option for exerting torque on carrier 26 with the engine off is a brake on transmission input shaft 24. Note that, since the transmission input shaft is not rotating, generating a reaction torque does not require generating any power. With a brake fully engaged at transmission input shaft 24, torque generated by generator 30 is transmitted to the vehicle wheels. The torque contribution may be either positive or negative and may be exerted when the vehicle is moving forwards or backwards or is stationary. For example, when the driver wants to propel the vehicle faster, the generator contributes torque in the same direction as vehicle motion, which requires use of electrical energy. This is particularly useful for reverse since the engine is not capable of contributing sustained reverse wheel torque. During a regenerative braking maneuver, the generator may contribute wheel torque opposite to the direction of vehicle movement, resulting in generation of electrical power to be stored in battery 62. This is particularly useful at lower speeds where the capability of the powertrain to recover energy is limited by the torque capacity as opposed to being limited by the capacity of the battery to absorb the energy.

However, placing a brake on transmission input shaft 24 poses a number of problems. Specifically, the engine compartments of modern vehicles tend to be narrow, so the axial length of the transmission is limited. A brake on the transmission input shaft is very likely to increase the overall axial length of the transmission. Secondly, the types of brakes typically used in automotive transmissions are actuated by hydraulic pressure. The transmission of FIG. 1 does not include a hydraulic pump capable of generating sufficient pressure and a valve body to control and direct that pressure to a hydraulically controlled brake.

Figure 2:
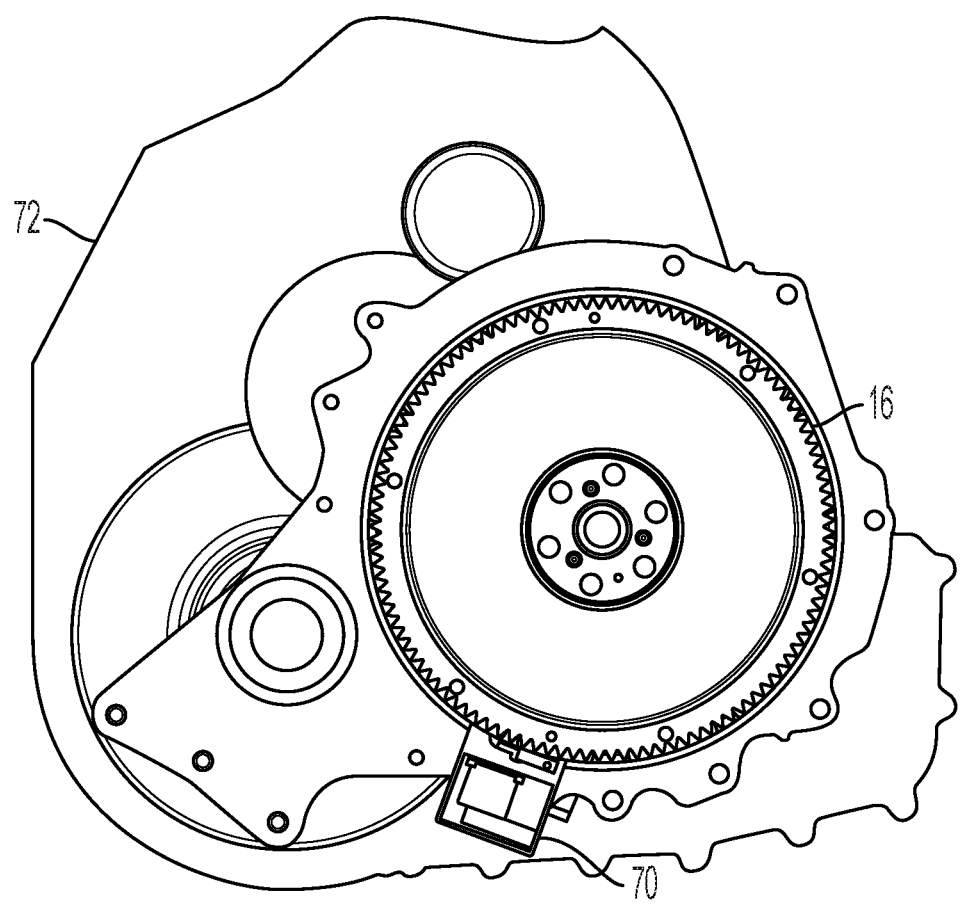
FIG. 2 is an end view of a transmission and flywheel.

An electrically actuated brake engaging ring gear 16 resolves packaging issues and does not require enhancement of the transmission hydraulic system. FIG. 2 illustrates a potential location of an electro-magnetically actuated brake 70. The brake mechanism and the actuation mechanism are mounted externally to transmission case 72. The brake engages ring gear 16 to hold crankshaft 12, transmission input shaft 24, and carrier 26 against rotation.

Figure 3:
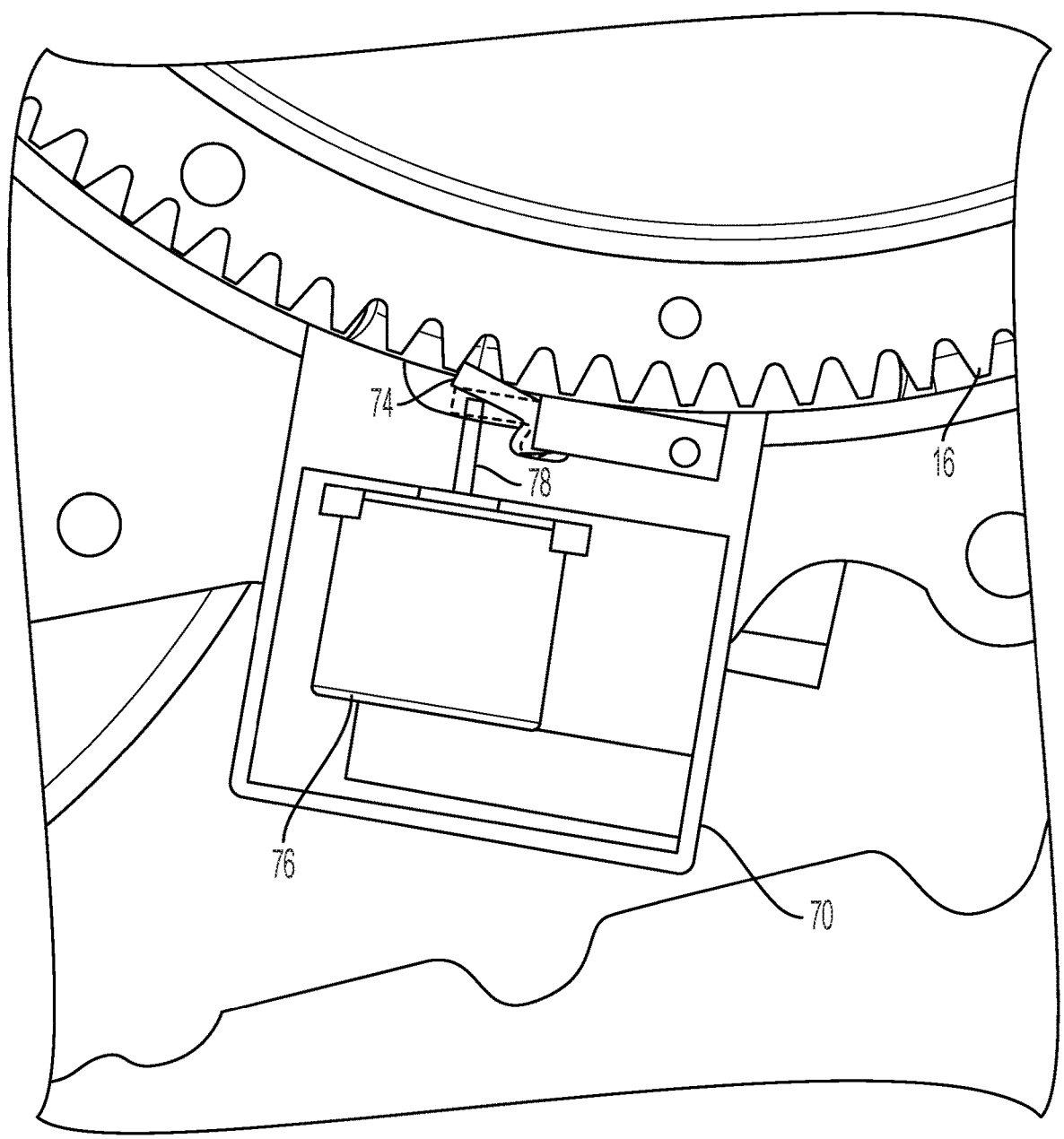
FIG. 3 is an end view of a first flywheel brake.

FIG. 3 illustrates a first type of electro-magnetically actuated brake 70. A pawl 74 is pivotably supported. In the position shown in FIG. 3, pawl 74 engages ring gear 16 to prevent the ring gear from rotating in the counter-clockwise direction. In response to electrical current from a controller, solenoid 76 pushes pin 78 to force pawl 74 into this engaged position. Clockwise rotation of ring gear 16 may cause pawl 74 to pivot against the force of the solenoid such that clockwise rotation of ring gear 16 is not prevented. When current is removed from solenoid 76, a spring and/or gravity causes pawl 74 to pivot out of engagement with ring gear 16, freeing ring gear 16 to rotate in either direction.

Figure 4:
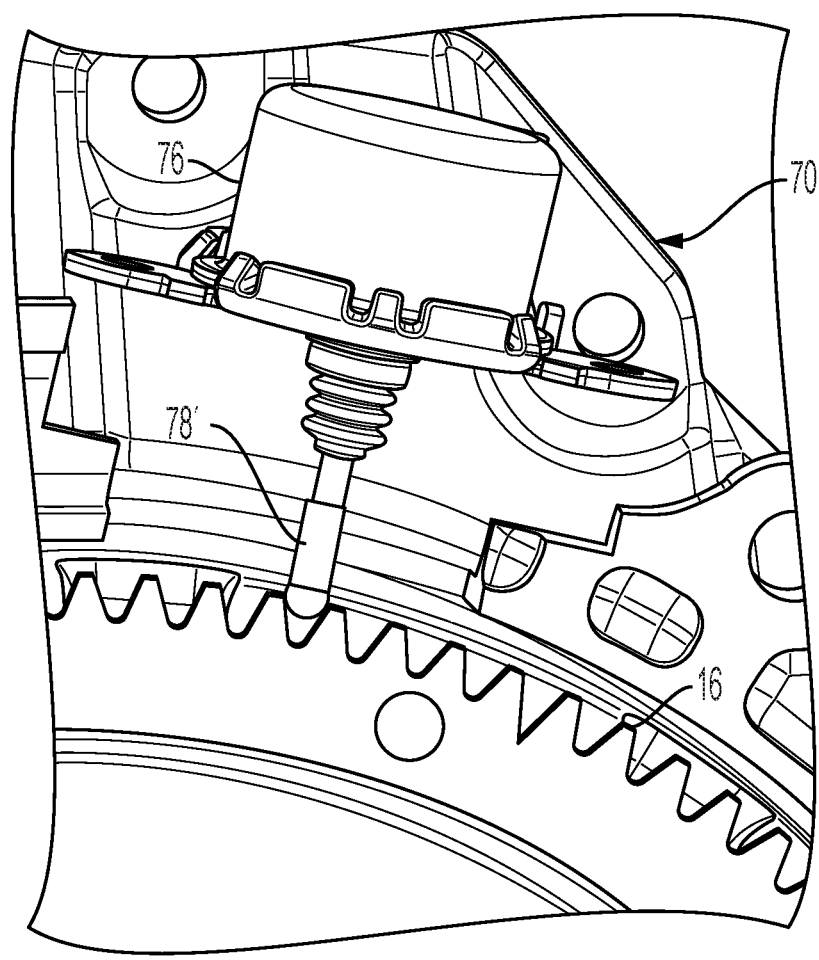
FIG. 4 is an end view of a second flywheel brake.

FIG. 4 illustrates a second type of electro-magnetically actuated brake 70. In response to electrical current from a controller, solenoid 76 pushes pin 78' into engagement with ring gear 16. In FIG. 4, pin 78' extends radially between gear teeth. In other embodiments, pin 78' may extend axially between gear teeth or otherwise engage features of ring gear 16 to restrain rotation of ring gear 16. When pin 78' engages ring gear 16, ring gear 16 is held against rotation in either direction. When current is removed from solenoid 76, pin 78' retracts freeing ring gear 16 to rotate in either direction.

Figure 5:
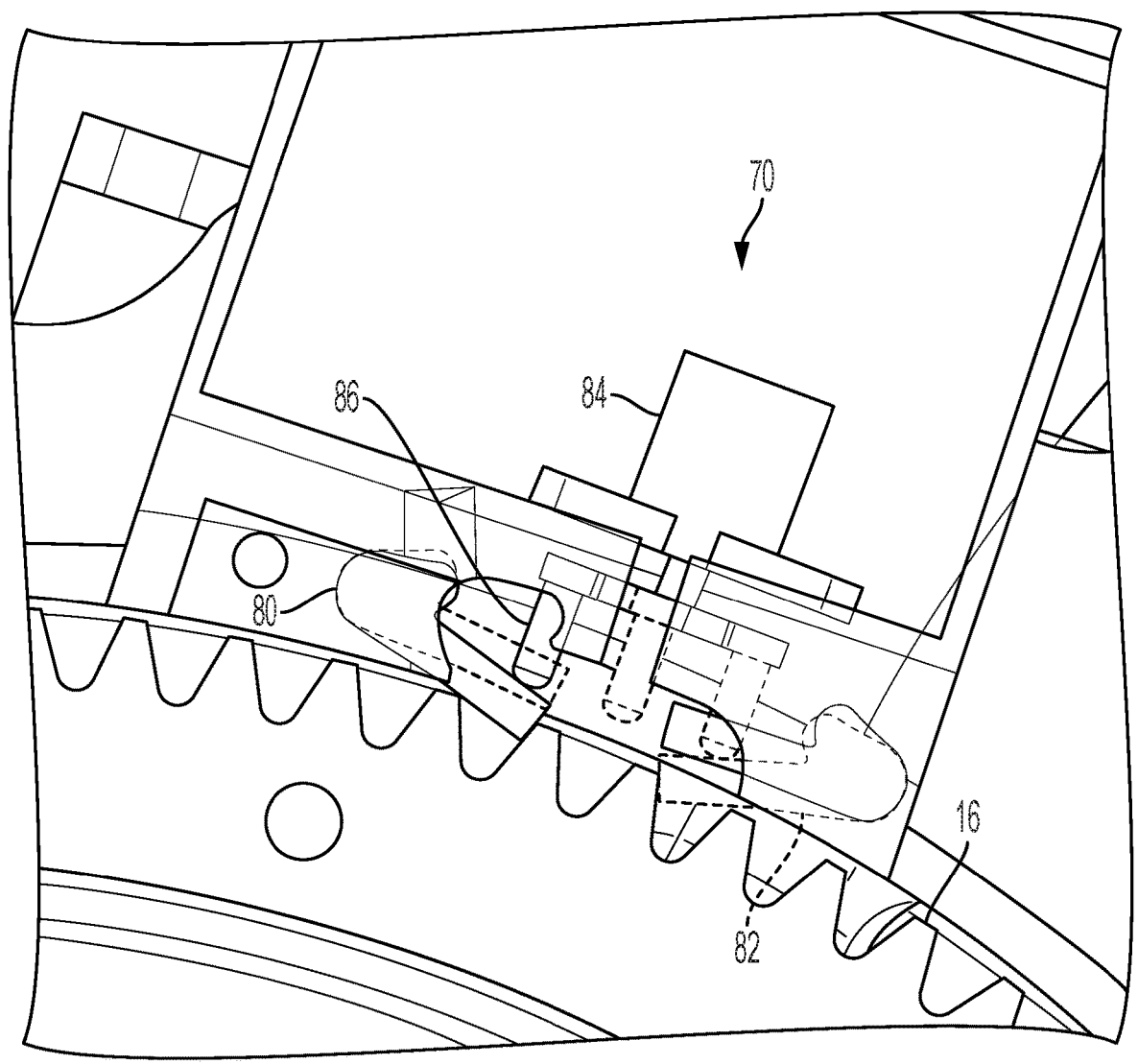
FIG. 5 is an end view of a third flywheel brake.

FIG. 5 illustrates a third type of electro-magnetically actuated brake 70. A first pawl 80 is pivotably supported such that, in the engaged position shown in FIG. 5, it prevents counter-clockwise rotation of ring gear 16. Similarly, a second pawl 82 is pivotably supported such that, in the engaged position, it prevents clockwise rotation of ring gear 16. In response to signals from a controller, rotary solenoid 84 moves pin 86 among three positions. In the left-most position, pin 86 pushes pawl 80 into engagement with ring gear 16 while permitting pawl 82 to retract out of engagement. In the central position, pin 86 allows both pawls 80 and 82 to retract out of engagement such that ring gear 16 is free to rotate in either direction. In the right-most position, pin 86 pushes pawl 82 into engagement with ring gear 16 while permitting pawl 80 to retract out of engagement. The rotary solenoid may move the pin to the left-most position in response to current in a first direction and move the pin to the left-most direction in response to current in the opposite direction. The pin may move to the center position in response to a lack of electrical current.

Figure 6:
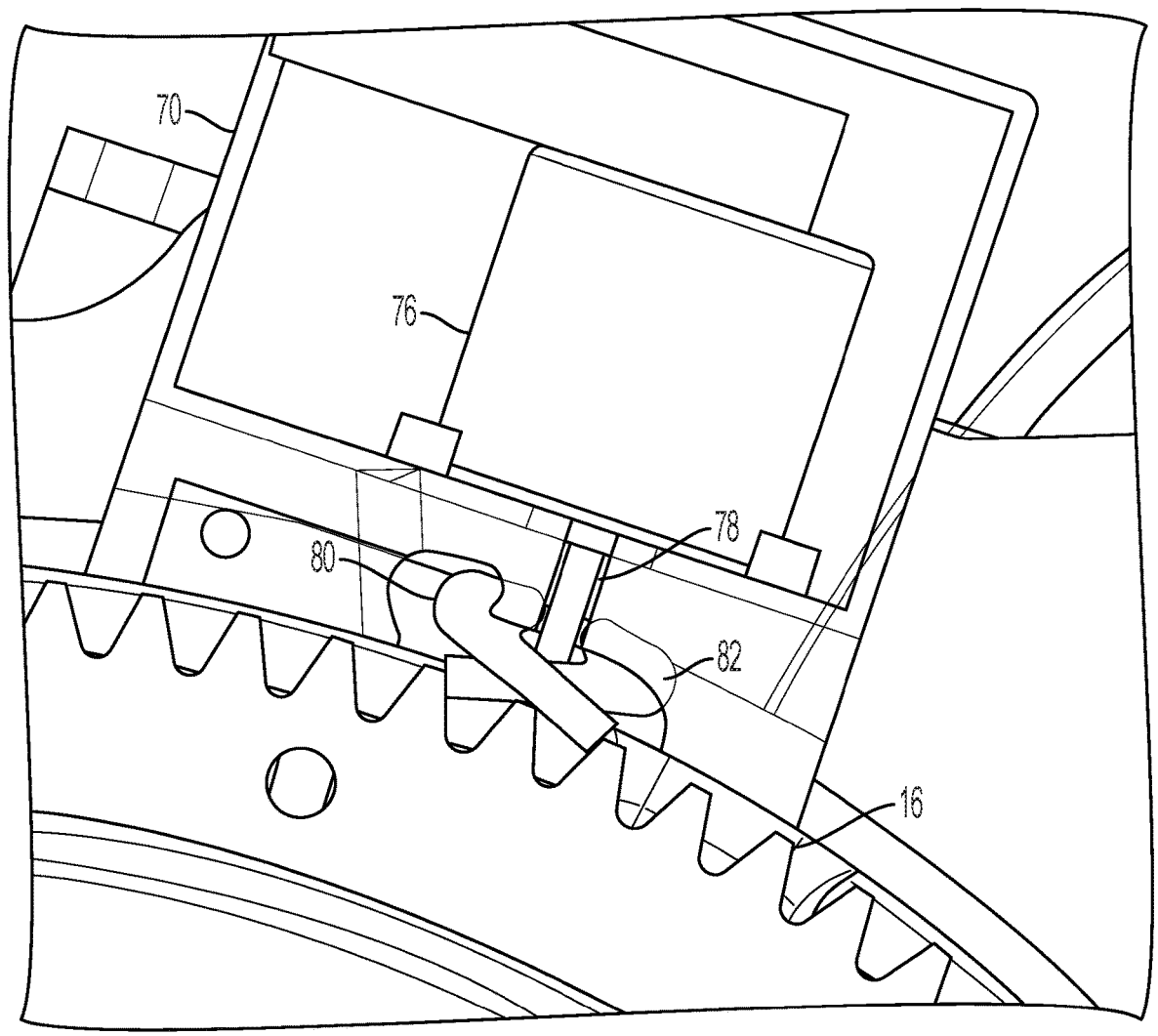
FIG. 6 is an end view of a fourth flywheel brake.

FIG. 6 illustrates a fourth type of electro-magnetically actuated brake 70. A first pawl 80 is pivotably supported such that, in the engaged position shown in FIG. 6, it prevents counter-clockwise rotation of ring gear 16. Similarly, a second pawl 82 is pivotably supported such that, in the engaged position shown in FIG. 6, it prevents clockwise rotation of ring gear 16. In response to signals from a controller, solenoid 76 extends pin 78, forcing both pawls 80 and 82 to pivot into the engaged position. In this condition, ring gear 16 is held against rotation in both directions. When current is withdrawn, pin 78 retract allowing pawls 80 and 82 to retract such that ring gear 16 is free to rotate in either direction.

The brakes of FIGS. 3-6 hold the transmission input shaft stationary during periods in which the engine is stopped. This provides a reaction force at carrier 26 such that torque from generator 34 applied at sun gear 30 is transmitted to ring gear 32 and then to the vehicle wheels. In the embodiment of FIG. 3, the brake only provides a reaction force in one direction, such that generator 34 can only contribute torque in one direction. For example, generator 34 may be able to provide reverse torque for regenerative braking while the vehicle is moving forward and reverse torque for propulsion while the vehicle is in reverse. In the embodiments of FIGS. 4 and 6, the brake provides a reaction torque in both directions, so generator 34 can also be used to provide forward torque for forward propulsion or for regenerative braking in reverse. In the embodiment of FIG. 6, the brake provides reaction torque in only one direction at a time, but the controller can select the direction needed for current conditions.

None of the embodiments use space within the transmission case, nor do they add axial length to the powertrain. Each can be located in available space around the periphery of the starter ring gear.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle powertrain comprising:
    an internal combustion engine having a crankshaft coupled to a flywheel having a ring gear;
    a transmission having an input shaft coupled to the flywheel; and
    a brake configured to selectively engage the ring gear to selectively hold the crankshaft against rotation.

2. The vehicle powertrain of claim 1 wherein the transmission comprises:
    a planetary gear set having a sun driveably connected to a first electric machine, a carrier sun coupled to the input shaft, and a ring drivably connected to a differential; and
    a second electric machine driveably connected to the differential.

3. The vehicle powertrain of claim 1 further comprising a starter motor driving a pinion gear wherein the pinion gear is configured to selectively engage the ring gear to start the engine.

4. The vehicle powertrain of claim 1 wherein the brake is electrically actuated.

5. The vehicle powertrain of claim 1 wherein the brake is configured to selectively hold the crankshaft against rotation in one direction while permitting rotation in an opposite direction.

6. A vehicle powertrain comprising:
    an internal combustion engine having a crankshaft coupled to a flywheel having a ring gear;
    a planetary gear set having a sun driveably connected to a first electric machine, a carrier sun coupled to the flywheel, and a ring drivably connected to a differential; and
    a second electric machine driveably connected to the differential; and a brake configured to selectively engage the ring gear to selectively hold the crankshaft against rotation.

7. The vehicle powertrain of claim 6 further comprising a starter motor driving a pinion gear wherein the pinion gear is configured to selectively engage the ring gear to start the engine.

8. The vehicle powertrain of claim 6 wherein the brake comprises:
a first pawl supported to pivot between a first disengaged position and a first engaged position wherein, in the first engaged position, the first pawl prevents rotation of the ring gear in a first direction; and
a solenoid configured to move a pin in response to electric current such that the pin pushes the first pawl into the first engaged position.

9. The vehicle powertrain of claim 8 further comprising a second pawl supported to pivot between a second disengaged position and a second engaged position wherein, in the second engaged position, the second pawl prevents rotation of the ring gear in a second direction opposite the first direction.

10. The vehicle powertrain of claim 9 wherein extension of the pin simultaneously pushes the first pawl into the first engaged position and the second pawl into the second engaged position.

11. The vehicle powertrain of claim 9 wherein the solenoid pushes the first pawl into the first engaged position in response to an electrical current and pushes the second pawl into the second engaged position in response to an opposite electrical current.

12. The vehicle powertrain of claim 6 wherein the brake comprises a solenoid configured to move a pin into engagement with the ring gear in response to electric current such that the pin prevents rotation of the ring gear.

13. A transmission comprising:
a flywheel having a ring gear and adapted for fixation to a crankshaft of an internal combustion engine;
an input shaft coupled to the flywheel; and
a brake configured to selectively engage the ring gear to selectively hold the crankshaft against rotation.

14. The transmission of claim 13 further comprising:
a planetary gear set having a sun driveably connected to a first electric machine, a carrier sun coupled to the input shaft, and a ring drivably connected to a differential; and
a second electric machine driveably connected to the differential.

15. The transmission of claim 13 further comprising a starter motor driving a pinion gear wherein the pinion gear is configured to selectively engage the ring gear to start the engine.

16. The transmission of claim 13 wherein the brake is electrically actuated.

17. The transmission of claim 16 wherein the brake is configured to selectively hold the crankshaft against rotation in one direction while permitting rotation in an opposite direction.

* * * * *